United States Patent
Bui et al.

(10) Patent No.: US 10,822,460 B1
(45) Date of Patent: *Nov. 3, 2020

(54) FORMULATIONS FOR 3D PRINTING OF ISOTHIOCYANATE-MODIFIED POLYSILAZANES OR POLYCARBOSILANES

(71) Applicant: HRL Laboratories, LLC, Malibu, CA (US)

(72) Inventors: Phuong Bui, Thousand Oaks, CA (US); Zak C. Eckel, Thousand Oaks, CA (US); April R. Rodriguez, Santa Monica, CA (US)

(73) Assignee: HRL Laboratories, LLC, Malibu, CA (US)

(*) Notice: Subject to any disclaimer, the term of this patent is extended or adjusted under 35 U.S.C. 154(b) by 209 days.

This patent is subject to a terminal disclaimer.

(21) Appl. No.: 16/029,527

(22) Filed: Jul. 6, 2018

Related U.S. Application Data

(60) Provisional application No. 62/629,209, filed on Feb. 12, 2018, provisional application No. 62/554,621, filed on Sep. 6, 2017.

(51) Int. Cl.
| | | |
|---|---|---|
| *C08G 77/62* | (2006.01) | |
| *C04B 35/589* | (2006.01) | |
| *C04B 35/597* | (2006.01) | |
| *B28B 1/00* | (2006.01) | |
| *B33Y 70/00* | (2020.01) | |
| *C04B 35/571* | (2006.01) | |
| *B33Y 10/00* | (2015.01) | |

(52) U.S. Cl.
CPC .............. *C08G 77/62* (2013.01); *B28B 1/001* (2013.01); *B33Y 70/00* (2014.12); *C04B 35/571* (2013.01); *C04B 35/589* (2013.01); *C04B 35/597* (2013.01); *B33Y 10/00* (2014.12); *C04B 2235/602* (2013.01)

(58) Field of Classification Search
None
See application file for complete search history.

(56) References Cited

U.S. PATENT DOCUMENTS

| | | |
|---|---|---|
| 4,395,460 A | 7/1983 | Gaul |
| 4,575,330 A | 3/1986 | Hull |
| 4,816,497 A * | 3/1989 | Lutz ................. C04B 35/589 |
| | | 428/364 |
| 5,001,090 A | 3/1991 | Schwark |
| 5,698,485 A | 12/1997 | Bruck et al. |
| 6,573,020 B1 | 6/2003 | Hanemann et al. |
| 7,297,374 B1 * | 11/2007 | Arney .................... B82Y 10/00 |
| | | 427/510 |
| 7,582,685 B2 | 9/2009 | Arney et al. |
| 2002/0042491 A1 | 4/2002 | Brader et al. |
| 2006/0069176 A1 | 3/2006 | Bowman et al. |

FOREIGN PATENT DOCUMENTS

| | | | |
|---|---|---|---|
| EP | 0442013 B1 | 6/1996 | |
| WO | WO-2006071907 A1 * | 7/2006 | ........... G03F 7/2053 |

OTHER PUBLICATIONS

TB2: KiON® Ceraset® Polyureasilazane and KiON® Ceraset® Polysilazane 20, 2008.

* cited by examiner

*Primary Examiner* — Sanza L. McClendon
(74) *Attorney, Agent, or Firm* — O'Connor & Company

(57) ABSTRACT

Some variations provide a preceramic resin precursor formulation comprising: first molecules containing at least one Si—N bond and/or at least one Si—C bond; and second molecules of the formula $R_4$—N=C=S, wherein $R_4$ may be a UV-active functional group. In some embodiments, $R_4$ is selected from ethynyl, vinyl, allyl, acrylate, methacrylate, vinyl ether, epoxide, oxetane, thiol, thioketone, isothiocyanate, or combinations thereof. The first and second molecules are reacted with an isothiocyanate to form third molecules, providing a preceramic radiation-curable resin composition. The resin composition contains at least one Si—N bond and/or at least one Si—C bond in the main chain of the third molecules. Side chains of the third molecules may be selected from hydrogen, unsubstituted or substituted hydrocarbon groups, halides, esters, amines, hydroxyl, or cyano. The resin composition may be 3D printed and thermally treated to generate a ceramic material.

24 Claims, No Drawings

US 10,822,460 B1

FORMULATIONS FOR 3D PRINTING OF ISOTHIOCYANATE-MODIFIED POLYSILAZANES OR POLYCARBOSILANES

PRIORITY DATA

This patent application is a non-provisional application with priority to U.S. Provisional Patent App. No. 62/629,209, filed Feb. 12, 2018, and to U.S. Provisional Patent App. No. 62/554,621, filed Sep. 6, 2017, each of which is hereby incorporated by reference herein.

FIELD OF THE INVENTION

The present invention generally relates to certain formulations suitable for making preceramic polymers, which can be converted into ceramic structures.

BACKGROUND OF THE INVENTION

In comparison with metals and polymers, ceramics are difficult to process, particularly into complex shapes. Because they cannot be cast or machined easily, ceramics are typically consolidated from powders by sintering or deposited in thin films. Flaws, such as porosity and inhomogeneity introduced during processing, govern the strength because the flaws initiate cracks, and—in contrast to metals—brittle ceramics have little ability to resist fracture. This processing challenge has limited the ability to take advantage of ceramics' impressive properties, including high-temperature capability, environmental resistance, and high strength.

Ceramic matrix composite (CMC) materials overcome many disadvantages of conventional ceramics, such as brittle failure, low fracture toughness, and limited thermal shock resistance. Applications of ceramic matrix composites include those requiring reliability at high temperatures (beyond the capability of metals or polymers) and resistance to corrosion and wear.

Recent advances in additive manufacturing have led to a multitude of different techniques, but additive manufacturing techniques developed for ceramic materials only process unreinforced ceramics and not ceramic matrix composites. Only a few of the commercially available three-dimensional (3D) printing systems offer printing of ceramics, either by selective curing of a photosensitive resin that contains ceramic particles, selective deposition of a liquid binder agent onto ceramic particles (binder jetting), or selective fusion of a powder bed with a laser. All these techniques are limited by slow fabrication rates, and in many cases, a time-consuming binder removal process. By starting with powders that need to be consolidated to a dense part, it is an almost insurmountable challenge to add reinforcement and create ceramic matrix composites without fusing or reacting the matrix and the second phase, losing reinforcing capability. Furthermore, many additive manufacturing processes introduce large thermal gradients that tend to cause cracks in ceramics. Pores, cracks, and inhomogeneities are often responsible for the low strength and poor reliability of additively manufactured ceramic parts.

No mature method for 3D printing of ceramic matrix composites exists. Currently, CMC materials are limited to manual lay-up, molding, or thermoforming. There are also known techniques for sintering ceramic particles or using ceramic particles printed in an organic binder, both of which typically produce porous ceramics that have lower strength than the parent material. Ceramic structures are typically sintered as compacted porous materials, severely limiting the manufacturable geometries.

Formulations have been described for creating ceramic materials that can be printed (additively manufactured) with various methods such as stereolithography techniques and laser sintering. These are typically unreinforced ceramics that do not contain a second phase and suffer from low fracture toughness. These methods are described in Zocca et al., "Additive Manufacturing of Ceramics: Issues, Potentialities, and Opportunities" *J. Am. Ceram. Soc.*, 98 [7] 1983-2001 (2015).

In addition, formulations which can create 1D or 2D ceramics, or very small 3D structures, have been described. See U.S. Pat. No. 4,816,497 issued Mar. 28, 1989 to Lutz et al.; U.S. Pat. No. 5,698,485 issued Dec. 16, 1997 to Bruck et al.; U.S. Pat. No. 6,573,020 issued Jun. 3, 2003 to Hanemann et al.; U.S. Pat. No. 7,582,685 issued Sep. 1, 2009 to Arney et al.; and U.S. Patent App. Pub. No. US2006/0069176A1 published Mar. 30, 2006 to Bowman et al.

Preceramic polymers are a class of polymers which allow, via a thermal treatment, a conversion of a polymer part to a ceramic material. Typically, these preceramic polymers contain silicon (Si) in the molecular backbone, with the resulting material containing Si. There are a wide variety of known preceramic polymers. Examples include polysilazanes, borazine-modified hydridopolysilazanes, polysilanes, polycarbosilanes, silicone resins, polyborazines, polyvinylborazine, polyborazylene, and decaborane-based polymers. These preceramic polymers have been used to form specific polymer-based structures that can be subsequently heat-treated (pyrolyzed or sintered) to create near net-shape ceramic structures.

A stereolithography technique provides a method to build a 3D polymer microstructure in a layer-by-layer process. This process usually involves a platform (e.g., substrate) that is lowered or raised into a photomonomer bath in discrete steps. At each layer, a laser is used to scan over the area of the photomonomer that is to be cured (i.e., polymerized) for that particular layer. Once the layer is cured, the platform is lowered or raised by a specific amount, determined by the processing parameters and desired feature/surface resolution, and the process is repeated until the complete 3D structure is created. One example of such a stereolithography technique is disclosed in U.S. Pat. No. 4,575,330 issued Mar. 11, 1986 to Hull et al.

Modifications to the above-described stereolithography technique have been developed to improve the polymer resolution by using laser optics and special resin formulations. Also, modifications have been made to decrease the fabrication time of the 3D polymer structure by using a dynamic pattern generator to cure an entire layer at once. One example of such a modification is disclosed in Bertsch et al., "Microstereo-lithography: A Review" *Materials Research Society Symposium Proceedings*, Vol. 758, 2003. Another advancement to the standard stereolithography technique includes a two-photon polymerization process, as disclosed in Sun et al., "Two-Photon Polymerization and 3D Lithographic Microfabrication" *Advances in Polymer Science*, Vol. 170, 169-273, 2004.

There exists a need for creating ceramic parts of various sizes through 3D printing, for engineering and other applications, without relying on either sintering of ceramic particles or the use of ceramic particles printed in an organic binder, both of which produce porous ceramics with reduced strength. Formulations are desired that allow for the direct conversion of preceramic polymers to dense ceramics with properties that approach the theoretical maximum strength of the base materials.

There is commercial demand for additively manufactured (3D-printed) ceramics in many fields including industrial filtration (molten metal filters, flow separators); metal processing (casting molds/blanks); implantable dental and medical devices; and semiconductor processing. Additive manufacturing of ceramic materials is also of interest for propulsion components, thermal protection systems, porous burners, microelectromechanical systems, and electronic device packaging, for example.

SUMMARY OF THE INVENTION

Some variations of the invention provide a preceramic radiation-curable resin composition comprising a molecule having the formula:

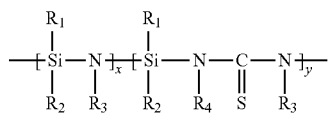

wherein:
x=0 to 100 when repeat units are connected linearly or are not present, or x=0 to 10 when repeat units are connected cyclically;
y=1 to 100 when repeat units are connected linearly or y=1 to 10 when repeat units are connected cyclically;
$R_1$ is selected from the group consisting of hydrogen, a $C_1$-$C_{18}$ unsubstituted or substituted group (including saturated or unsaturated groups), a halide, an ester group, an amine group, a hydroxyl group, a thiol group, a cyano group, a cyanate group, a thiocyanate group, and combinations thereof;
$R_2$ is selected from the group consisting of hydrogen, a $C_1$-$C_{18}$ unsubstituted or substituted group (including saturated or unsaturated groups), a halide, an ester group, an amine group, a hydroxyl group, a thiol group, a cyano group, a cyanate group, a thiocyanate group, and combinations thereof;
$R_3$ is selected from the group consisting of hydrogen, a $C_1$-$C_{18}$ unsubstituted or substituted group (including saturated or unsaturated groups), a halide, an ester group, an amine group, a hydroxyl group, a thiol group, a cyano group, a cyanate group, a thiocyanate group, and combinations thereof; and
$R_4$ is selected from the group consisting of hydrogen, a $C_1$-$C_{18}$ unsubstituted or substituted group (including saturated or unsaturated groups), a halide, an ester group, an amine group, a hydroxyl group, a thiol group, a cyano group, a cyanate group, a thiocyanate group, an alkyl halide, an aryl halide, and combinations thereof.

In some embodiments, each of $R_1$, $R_2$, $R_3$, and $R_4$ is independently selected from the group consisting of H, $CH_3$, $C_2H_3$, $C_3H_5$, and combinations thereof.

$R_4$ is a UV-active functional group, in some embodiments. For example, $R_4$ may be selected from the group consisting of vinyl, allyl, ethynyl, acrylate, methacrylate, vinyl ether, epoxide, oxetane, thiol, thioketone, isothiocyanate, and combinations, analogues, or derivatives thereof that optionally maintain UV activity.

In some embodiments, the composition further comprises a photoinitiator that generates free radicals from the molecule under exposure to light with a wavelength from about 200 nm to about 500 nm. The photoinitiator may be selected from the group consisting of 2,2-dimethoxy-2-phenylacetophenone, 2-hydroxy-2-methylpropiophenone, camphorquinone, bis(2,4,6-trimethylbenzoyl)-phenylphosphineoxide, benzophenone, benzoyl peroxide, thioxanthones, and combinations thereof, for example. The photoinitiator may be present in a concentration from about 0.001 wt % to about 10 wt % in the composition, for example.

When the composition comprises a photoinitiator, the composition further may comprise a radiation-trigger free-radical initiator active at a second wavelength that is substantially different from a first wavelength for which the photoinitiator is active.

In some embodiments, the composition further comprises a thermal free-radical initiator selected from the group consisting of benzoyl peroxide, dicumyl peroxide, 2,2'-azobisisobutyronitrile, platinum-carbonyl-cyclovinylmethylsiloxane complex, platinum-divinyltetramethyldisiloxane complex, and combinations thereof.

In some embodiments, the composition further comprises a free-radical inhibitor, such as (but not limited to) a free-radical inhibitor selected from the group consisting of hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, N-nitroso-N-phenylhydroxylamine aluminum salt, and combinations thereof. The free-radical inhibitor may be present in a concentration from about 0.001 wt % to about 10 wt % in the composition, for example.

In some embodiments, the composition further comprises a 3D-printing resolution agent selected from the group consisting of UV absorbers, fluorescent molecules, optical brighteners, and combinations thereof. For example, the 3D-printing resolution agent may be selected from the group consisting of 2-(2-hydroxyphenyl)-benzotriazole, 2-hydroxyphenyl-benzophenones, 2-hydroxyphenyl-s-triazines, thiophenediyl)bis(5-tert-butylbenzoxazole), 2,2'-(1,2-ethenediyl)bis(4,1-phenylene)bisbenzoxazole, and combinations thereof. The 3D-printing resolution agent may be present in a concentration from about 0.001 wt % to about 10 wt % in the composition, for example.

In some embodiments, the composition further comprises a crosslinking aid with UV functionality. The crosslinking aid may be selected from the group consisting of thioacrylates, allyl acrylate, allyl methacrylate, vinyl acrylate, vinyl methacrylate, 1,2-ethanedithiol, 1,3-propanedithiol, 2,2'-thiodiethanethiol, 2-propene-1-thiol, organic compounds containing C=X double bonds and/or C≡X triple bonds (X is C, N, S, and/or O), and combinations thereof, for example. The crosslinking aid may be present in a concentration from about 0.001 wt % to about 30 wt % in the composition, for example.

In certain embodiments, the composition further comprises from about 0.1 vol % to about 70 vol % of solid-phase fillers. The optional solid-phase fillers may have a wide range of compositions, including various metals and ceramics. For example, solid ceramic or metal filler compositions may include, but are not limited to, silicon-based ceramics such as SiOC, $SiO_2$, SiCN, SiC, SiCBN, SiOCN, $Si_3N_4$, silicate glasses, etc. Solid ceramic or metal filler compositions may include non-silicon-based ceramics such as metal oxides, e.g. $Al_2O_3$, $ZrO_2$, $TiO_2$, or $Y_3Al_5O_{12}$. Solid ceramic or metal filler compositions may include carbide-based ceramics such as carbon, graphene, diamond, and metal carbides, e.g. TiC, ZrC, HfC, or $B_4C$. Solid ceramic or metal filler compositions may include nitride-based ceramics, e.g. BN, TiN, ZrN, AN, or $Si_3N_4$. Solid metal filler compositions may include pure metals or metal alloys, such as (but not limited to) alkali metals, alkaline earth metals, transition metals, post-transition metals, or combinations or alloys thereof.

When solid-phase fillers are present, a surfactant may also be included in the composition, to improve dispersion of, and/or minimize settling or agglomeration of, the solid-phase fillers. The surfactant may be present from about 0.001 wt % to about 15 wt % in the composition, for example. The surfactant may be selected from the group consisting of carboxylates, sulfate esters, sulfonate esters, phosphates, quaternary ammonium salts, betaines, sultaines, ethoxylates, methoxysilanes, and combinations thereof, for example.

Some variations of the invention provide starting formulations suitable for making the above-described compositions. In some variations, a preceramic resin precursor formulation comprises:

(a) a first material containing first molecules comprising at least one Si—N bond, at least one Si—C bond, or at least one Si—N bond and at least one Si—C bond; and (b) a second material containing second molecules of the formula:

$$R_4\text{—}N\text{=}C\text{=}S$$

wherein $R_4$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, an alkyl halide, an aryl halide, and combinations thereof.

In some embodiments, the first molecules contain side groups selected from the group consisting of hydrogen, halides, substituted or unsubstituted cyclic or acyclic alkyl groups, aryl groups, hydrocarbon groups containing C=X double bonds or C≡X triple bonds (X is C, S, O, and/or N), and combinations thereof. In certain embodiments, the first molecules contain side groups selected from the group consisting of vinyl, ethynyl, vinyl ether, vinyl ester, vinyl amides, vinyl triazine, vinyl isocyanurate, acrylate, methacrylate, diene, triene, and combinations thereof. Optionally, the first molecules further contain one or more atoms selected from the group consisting of B, Al, Ti, Zn, Zr, O, N, P, S, Ge, and combinations thereof.

In some embodiments, at least 10 wt %, 20 wt %, 30 wt %, 40 wt %, or 50 wt % of the first molecules is inorganic. In some embodiments, at least 10 wt %, 20 wt %, 30 wt %, 40 wt %, or 50 wt % of the first molecules is Si.

The first molecules may be selected from the group consisting of trivinylborazine; 2,4,6-trimethyl-2,4,6-trivinylcyclotrisilazane; 1,3,5,7-tetravinyl-1,3,5,7-tetramethylcyclotetrasilazane; B,B',B"-triethynyl-N,N',N"-trimethylborazine; B,B',B"-triethynylborazine; 1,2,3,4,5,6-hexamethylcyclotrisilazane; 1,1,3,3,5,5-hexamethylcyclotrisilazane; 1,2-dimethylsilazane; 1,1-perhydrosilazane; 1,3-divinyl-1,3-diphenyl-1,3-dimethyldisilazane; 1,3-divinyl-1,1,3,3-tetramethyldisilazane; 1,3,5,7-tetravinyl-1,3,5,7-tetramethylcyclotetrasilazane; 1,3,5-trivinyl-1,3,5-trimethylcyclotrisilazane; 1,1,3,3,5,5,7,7-octamethylcyclotetrasilazane; 1,2,3,4,5,6,7,8-octamethylcyclotetrasilazane; 2,2,4,4,6,6,-hexamethylcyclotrisilazane; 1,1-dimethylcyclosilazanes; poly(1,1-dimethylsilazane); poly(1,2-dimethylsilazane); polymethylcarbosilane; polyallylcarbosilane; and combinations thereof, for example.

In some embodiments, the first molecules have the formula:

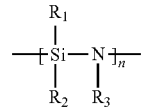

wherein:

n=1 to 100 when repeat units are connected linearly or n=2 to 10 when repeat units are connected cyclically;

$R_1$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof;

$R_2$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof; and $R_3$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof.

In some embodiments, each of $R_1$, $R_2$, and $R_3$ is independently selected from the group consisting of H, $CH_3$, $C_2H_3$, $C_3H_5$, and combinations thereof.

In some embodiments, $R_4$ (in the second molecules) is selected from the group consisting of allyl, ethynyl (or other alkynes), acrylate, methacrylate, vinyl ether, epoxide, oxetane, thiol, thioketone, isothiocyanate, and combinations, analogues, or derivatives thereof.

In some formulations, an aprotic organic solvent is present in a concentration from about 1 wt % to about 99 wt % in the formulation, for example. The aprotic organic solvent may be selected from the group consisting of pentane, hexane, cyclohexane, toluene, diethyl ether, tetrahydrofuran, 2-methyltetrahydrofuran, pyridine, n-methylpyrrolidine, chloroform, and combinations thereof, for example.

In some formulations, a free-radical inhibitor is present in a concentration from about 0.001 wt % to about 10 wt % in the formulation, for example. The free-radical inhibitor may be selected from the group consisting of hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, N-nitroso-N-phenylhydroxylamine aluminum salt, and combinations thereof, for example.

In some formulations, a crosslinking aid with UV functionality is present in a concentration from about 0.001 wt % to about 30 wt % in the formulation, for example. The crosslinking aid may be a compound selected from the group consisting of thioacrylates, allyl acrylate, allyl methacrylate, vinyl acrylate, vinyl methacrylate, 1,2-ethanedithiol, 1,3-propanedithiol, 2,2'-thiodiethanethiol, 2-propene-1-thiol, organic compounds containing C=X double bonds and/or C≡X triple bonds (X is C, N, S, and/or O), and combinations thereof, for example.

Other variations of the invention provide a method of making a preceramic radiation-curable resin composition, the method comprising:

(a) obtaining a first material containing first molecules comprising at least one Si—N bond, at least one Si—C bond, or at least one Si—N bond and at least one Si—C bond; and (b) obtaining a second material containing second molecules of the formula:

$$R_4-N=C=S$$

wherein $R_4$ may be selected from the group consisting of hydrogen, a $C_1$-$C_{18}$ unsubstituted or substituted group, a halide, an ester group, an amine group, a hydroxyl group, a cyano group, an alkyl halide, an aryl halide, and combinations thereof; and (c) reacting the first material with the second material, to generate a third material containing third molecules comprising at least one Si—N bond, at least one Si—C bond, or at least one Si—N bond and at least one Si—C bond, wherein the third molecules further comprise a $R_4$—N bond and a N—C=S sequence.

In some embodiments, the molar ratio of the second molecules to the first molecules is selected from about 1 to about n, wherein n is the average degree of polymerization of the first molecules.

In some methods, step (c) is conducted in the presence of an aprotic organic solvent. In some methods, step (c) is conducted in the presence of a polymerization inhibitor.

Step (c) may be conducted in an inert atmosphere. Step (c) may be conducted at a temperature from about 0° C. to about 200° C., such as from about 10° C. to about 125° C. Step (c) may be conducted for about 10 minutes to about 48 hours.

In some embodiments, the method further comprises purifying the third material, wherein the purifying is selected from the group consisting of solvent/solvent extraction, evaporation, distillation, vacuum distillation, chromatography, filtration, centrifugation, and combinations thereof, for example.

In certain methods, the first molecules have the formula:

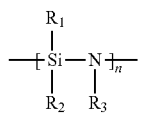

and the third molecules have the formula:

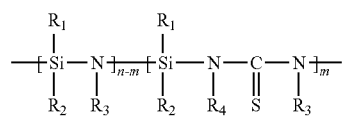

wherein:
n=1 to 100 when repeat units of the first molecules are connected linearly or n=2 to 10 when repeat units of the first molecules are connected cyclically;
m=1 to 100 and is the number of the second molecules that react with each of the first molecules;
n−m is 0 or greater (e.g., 0.1, 0.5, 1, or greater);
$R_1$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof;
$R_2$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof;
$R_3$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof; and
$R_4$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, an alkyl halide, an aryl halide, and combinations thereof.

The method further may comprise 3D printing and thermally treating the preceramic radiation-curable resin composition to generate a ceramic material.

DETAILED DESCRIPTION OF EMBODIMENTS OF THE INVENTION

The compositions, formulations, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

This disclosure describes resin formulations, compositions, and methods for 3D printing of preceramic polymer parts that are then fired or pyrolyzed to produce a ceramic part. Ceramic materials are prepared from a starting preceramic monomer/oligomer formulation that can be used in UV-cure-based, direct, free-form 3D printing to form polymer composite parts, which may then be directly converted to the ceramic material. Electromagnetic-radiation curability of the resin formulations enables definition of three-dimensional shapes via 3D printing.

This disclosure describes the production of 3D-printed ceramic parts. The 3D-printed ceramic material is prepared directly from 3D-printed preceramic polymer material, which is prepared from preceramic monomer formulations. The 3D printing may be done though stereolithography, UV (or other electromagnetic radiation) curing, laser rastering, digital light processing, liquid crystal device projection, or other techniques.

In particular, formulations provided herein include polysilazane or polycarbosilane precursors (monomers, oligomers, or polymers) modified by reaction with isothiocyanates containing, or providing (by reaction), UV functionality. The UV functionality may include, but is not limited to, thiourea, acrylate, methacrylate, epoxide, and/or thiol functionalities. Polysilazane and/or polycarbosilane precursors may include, but are not limited to, linear or cyclic molecules which may have a secondary functionality such as an allyl or vinyl group for thermal crosslinking, or which may have complimentary UV functionality such as thiol-ene crosslinking.

The isothiocyanate (R—N=C=S) will readily react and insert into the polysilazane or polycarbosilane backbone, forming a thiourea linkage (—N—C(=S)—N—) within the polymer. The isothiocyanate group —N=C=S may provide UV-active functionality, and the isothiocyanate may be bonded to an R group that is or includes a UV-active functional group.

"Preceramic" in this disclosure refers to the capability to be ultimately converted to a ceramic material. A "preceramic composition" is a composition that can be converted into a ceramic material, either directly (e.g., by pyrolysis) or via multiple steps (e.g., by polymerization followed by pyrolysis). In particular, a preceramic composition may contain a preceramic polymer that can be pyrolyzed into a ceramic material, a resin that can be polymerized into a preceramic polymer, or both of these.

A "preceramic polymer" is characterized in that at least some of the polymer converts to a ceramic material when heated to a temperature above 200° C. at atmospheric pressure in a substantially inert gas environment. Preferably, at least 50 wt %, more preferably at least 90 wt %, and most preferably at least 99 wt % (e.g., essentially all) of the polymer converts to a ceramic material when heated to a temperature above 200° C. at atmospheric pressure in a substantially inert gas environment.

As intended herein, a "resin" means a composition capable of being polymerized or cured, further polymerized or cured, or crosslinked. Resins may include monomers, oligomers, prepolymers, or mixtures thereof. As used herein, "polymer resin" means monomer, oligomer, prepolymer, or other molecule that is converted to a polymer.

"Radiation-curable" in this disclosure is synonymous with "electromagnetic radiation-curable." All references to "UV," "UV-curable," "UV-cure-based" and the like shall include reference not only to ultraviolet radiation but also other electromagnetic radiation bands that can be effective in various embodiments, including microwave radiation, terahertz radiation, infrared radiation, visible radiation (light), ultraviolet radiation, and X-rays.

In some embodiments, the radiation-curable liquid composition is a UV-curable inorganic composition, which may be a preceramic resin composition. In other embodiments, the radiation-curable liquid composition is a UV-curable organic composition.

The invention in various embodiments applies to additively manufactured components, such as to reduce part count, scrap, or non-recurring engineering. Some embodiments apply to high-wear or high-temperature applications that would necessitate ceramic materials. Specific applications of interest include, for example, propulsion structures (vanes, impellors, nacelles, and thrusters), control surfaces (fins and leading edges), hypersonic structures (thermal protection systems and heat shields), high-wear components (brakes, clutches, and rotors), catalyst support structures, membrane reactors, pump components, filters, brakes, clutches, molten metal filters, flow separators, semiconductor processing.

Some variations provide a preceramic radiation-curable resin composition comprising molecules having the formula:

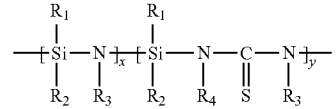

wherein:

$x=0$ to 100 when repeat units are connected linearly or are not present, or $x=0$ to 10 when repeat units are connected cyclically or are not present;

$y=1$ to 100 when repeat units are connected linearly or $y=1$ to 10 when repeat units are connected cyclically;

$R_1$ is selected from the group consisting of hydrogen, a $C_1$-$C_{18}$ unsubstituted or substituted group (including saturated or unsaturated groups), a halide, an ester group, an amine group, a hydroxyl group, a thiol group, a cyano group, a cyanate group, a thiocyanate group, and combinations thereof;

$R_2$ is selected from the group consisting of hydrogen, a $C_1$-$C_{18}$ unsubstituted or substituted group (including saturated or unsaturated groups), a halide, an ester group, an amine group, a hydroxyl group, a thiol group, a cyano group, a cyanate group, a thiocyanate group, and combinations thereof;

$R_3$ is selected from the group consisting of hydrogen, a $C_1$-$C_{18}$ unsubstituted or substituted group (including saturated or unsaturated groups), a halide, an ester group, an amine group, a hydroxyl group, a thiol group, a cyano group, a cyanate group, a thiocyanate group, and combinations thereof; and $R_4$ is selected from the group consisting of hydrogen, a $C_1$-$C_{18}$ unsubstituted or substituted group (including saturated or unsaturated groups), a halide, an ester group, an amine group, a hydroxyl group, a thiol group, a cyano group, a cyanate group, a thiocyanate group, an alkyl halide, an aryl halide, and combinations thereof.

These molecules are formed through isothiocyanate insertion into silazane or carbosilane starting molecules. The starting molecules are described later, referred to as a "formulation" of molecules that are capable of reacting to generate this polymer molecule shown above, or other polysilazanes or polycarbosilanes.

When x>0, the x repeat units and they repeat units may be arranged in a block copolymer, a segmented copolymer, or an alternating copolymer, for example. In some embodiments, the x repeat units and they repeat units are arranged randomly. For example, if the isothiocyanate reaction (to form the product molecule) occurs at random repeat units of the starting molecule, the final polymer will be a random copolymer. If the isothiocyanate reaction is stoichiometric with all of the repeat units of the starting silazane molecule, then x=0, and the final polymer is a homopolymer, not a copolymer.

The repeat units within the above molecule may be arranged as linear repeat units, cyclic repeat units, branched repeat units, or a combination thereof. Branched repeat units themselves may be linear or cyclic. The molecule is depicted in a linear arrangement for convenience, without limitation. In some embodiments, the x repeat units and they repeat units are all connected linearly. In some embodiments, the x repeat units and they repeat units are connected within a cyclic molecule. As intended herein, a "cyclic molecule" is a molecule within which there is at least one atomic ring that contains at least two Si—N bonds. In certain embodiments, some of the x repeat units or y repeat units are connected within a cyclic portion of the molecule, while other of the x repeat units or y repeat units are connected within a linear portion of the molecule. When cyclic molecules or regions are present, then x+y is at least 2, such as 3, 4, 5, or more. As one example, the following molecule is a cyclic isothiocyanate-modified cyclic silazane in which x=2, y=1, x+y=3, and all of the x and y repeat units are present in a cyclic structure:

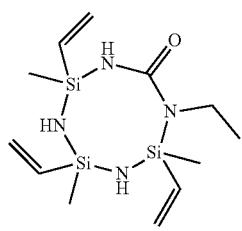

Within the preceramic radiation-curable resin composition, each of $R_1$, $R_2$, $R_3$, and $R_4$ may be hydrogen, an organic group, or an inorganic group. In some embodiments, each of $R_1$, $R_2$, $R_3$, and $R_4$ is independently selected from the group consisting of H, $CH_3$, $C_2H_3$, and combinations thereof.

In some preferred embodiments, $R_4$ is a UV-active functional group. As used herein, a "UV-active functional group" is a chemical group in the form of multiple atoms bonded together in a functional group that has absorption in the UV or visible region of electromagnetic radiation (wavelengths from about 100 nm to about 700 nm). Absorption (UV activity) occurs when a UV-active molecule absorbs ultraviolet or visible light that excites valence electrons, causing an electronic transition from a ground state to an excited state. UV absorption can be measured by a UV-visible spectrophotometer, which provides a spectrum of absorption versus wavelength.

In some embodiments, $R_4$ is a UV-active functional group selected from the group consisting of ethynyl, vinyl, allyl, acrylate, methacrylate, vinyl ether, epoxide, oxetane, thiol, thioketone, isothiocyanate, and combinations, analogues, or derivatives thereof that optionally maintain UV activity.

The molecules of the preceramic radiation-curable resin composition are thiourea compounds that contain a $R_4$—N bond and a N—C=S sequence, which are derived from insertion of an isothiocyanate $R_4$—N=C=S into a starting molecule, as explained in more detail below (with reference to starting formulations). Thioureas are known to occur in two tautomeric forms in equilibrium: the thione form with N—C=S bonds, as depicted in the above structure; and the thiol form with N=C—S bonds. The thiol form is also known as isothiourea (an isomer of thiourea). For purposes of the present invention, all references to a N—C=S sequence shall include reference to a N=C—S sequence or a combination of N—C=S and N=C—S sequences, to reflect the tautomeric equilibrium of the product molecules, without limitation. Exemplary reactions shown later explicitly depict the thiourea/isothiourea equilibrium.

The composition may further comprise a photoinitiator that generates free radicals from the molecule under exposure to light. In various embodiments, light exposure is produced from light having one or more wavelengths selected from about 200 nm to about 700 nm, such as about 250, 300, 350, 400, or 500 nm. The photoinitiator may generate free radicals under light exposure by intramolecular bond cleavage or intermolecular hydrogen abstraction, for example. Photoinitiators may be used when the polymerization is, or includes, free-radical polymerization.

For example, the photoinitiator may be selected from the group consisting of 2,2-dimethoxy-2-phenylacetophenone, 2-hydroxy-2-methylpropiophenone, camphorquinone, bis(2, 4,6-trimethylbenzoyl)-phenylphosphineoxide, benzophenone, benzoyl peroxide, thioxanthones, and combinations thereof. Oxygen and nitrogen dioxide may also be used as a photoinitiator. The photoinitiator, when included, may be present in a concentration from about 0.001 wt % to about 10 wt % in the composition. In various embodiments, the photoinitiator is about 0.001, 0.005, 0.01, 0.05, 0.1, 0.5, 1, 2, or 5 wt % of the formulation.

A combination of different types of photoinitiators may be used in the polymerization process. More than one photoinitiator may be included to allow multi-wavelength curing.

When a photoinitiator is present, the composition may further comprise a radiation-trigger free-radical initiator active at a second wavelength that is substantially different from a first wavelength for which the photoinitiator is active.

The composition may further comprise a thermal free-radical initiator that generates free radicals under elevated temperature conditions. The addition of thermal initiator allows for multiple-mechanism curing in the formulation—i.e., both UV and thermal curing. In some embodiments, a thermal free-radical initiator (e.g., a platinum complex catalyst) catalyzes vinyl addition. For example, a thermal free-radical initiator may be used to crosslink unreacted vinyl groups remaining which have not reacted with a thiol group, or to react vinyl groups with other available functional groups such as, but not limited to, methyl or hydroxyl groups. When a thermal free-radical initiator is used, a thermal post-cure after 3D printing may be done, such as by heating the preceramic polymer structure up to 300° C.

The thermal free-radical initiator may be selected from the group consisting of benzoyl peroxide, dicumyl peroxide, 2,2'-azobisisobutyronitrile, platinum-carbonyl-cyclovinylmethylsiloxane complex, platinum-divinyltetramethyldisiloxane complex, and combinations thereof. A combination of different types of thermal free-radical initiators may be employed.

The thermal free-radical initiator, when included, may be present in a concentration from about 0.001 wt % to about 10 wt % in the composition. In various embodiments, the thermal free-radical initiator is in a concentration of about 0.001, 0.01, 0.1, 1, 2, or 5 wt % of the formulation.

The composition may further comprise a crosslinking aid which contains molecules that generate free radicals following initiation and assist in the polymer crosslinking process. For example, crosslinking aids may help achieve a desired curing rate for the 3D-printing process. Crosslinking aids may be compounds with UV functionality, such as organosulfur compounds, organic compounds containing C=X double bonds and/or C≡X triple bonds (X is C, N, S, and/or O), or organic compounds containing acrylate, methacrylate, epoxide, thiourea, or thiol groups, for example.

Exemplary crosslinking aids include, but are not limited to, thioacrylates, allyl acrylate, allyl methacrylate, vinyl acrylate, vinyl methacrylate, 1,2-ethanedithiol, 1,3-propanedithiol, 2,2'-thiodiethanethiol, 2-propene-1-thiol, or a combination thereof. Multiple crosslinking aids may be included. The crosslinking aid, when included, may be present in a concentration from about 0.001 wt % to about 30% in the composition. In various embodiments, the crosslinking aid is in a concentration of about 0.01, 0.1, 1, 5, 10, 15, 20, or 25 wt % of the composition.

In some embodiments, the composition further comprises a free-radical inhibitor, such as an antioxidant. A free-radical inhibitor may be added to inhibit unwanted polymerization of regions outside the desired printing area, to allow sufficient resolution to the desired part, for example. A free-radical inhibitor can also deter shadow curing, which is normally not desired. Additionally, a free-radical inhibitor can improve long-term stability of the formulation and keep reaction kinetic parameters constant over time.

Exemplary free-radical inhibitors include, but are not limited to, hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, N-nitroso-N-phenylhydroxylamine aluminum salt, or combinations thereof.

The free-radical inhibitor, when included, may be present in a concentration from about 0.001 wt % to about 10 wt %, typically up to about 1 wt %, in the composition. In various embodiments, the free-radical inhibitor is in a concentration of about 0.001, 0.005, 0.01, 0.05, 0.1, 0.2, 0.5, 1, or 2 wt % of the formulation.

A "3D-printing resolution agent" is a compound that improves print quality and resolution by containing the curing to a desired region of the laser or light exposure. In certain embodiments, a 3D-printing resolution agent functions by absorbing light (e.g., UV or visible light) at a desired wavelength and converting the energy either into thermal energy or radiation at a higher wavelength. The use of a 3D-printing resolution agent can improve 3D-print quality and resolution by containing the curing to the region of the laser or light exposure that is the desired region laterally and/or vertically in the print bath.

The composition may comprise a 3D-printing resolution agent selected from the group consisting of UV absorbers, fluorescent molecules, optical brighteners, and combinations thereof. Exemplary 3D-printing resolution agents include, but are not limited to, 2-(2-hydroxyphenyl)-benzotriazole; 2-hydroxyphenyl-benzophenones; 2-hydroxyphenyl-s-triazines; 2,2'-(2,5-thiophenediyl)bis(5-tert-butylbenzoxazole); 2,2'-(1,2-ethenediyl)bis(4,1-phenylene)bisbenzoxazole; or a combination thereof.

When present, the 3D-printing resolution agent may be up to about 10 wt % of the liquid resin formulation, such as about 0.001, 0.01, 0.1, 0.5, 1, 2, 3, 4, 5, 6, 7, 8, or 9 wt % of the liquid resin formulation.

In certain embodiments, the composition further comprises from about 0.1 vol % to about 70 vol % of solid-phase fillers. These embodiments are discussed in more detail, below.

The composition may further comprise one or more surface-active agents in the form of surfactants, such as dispersants, emulsifiers, or wetting agents that decrease the interfacial tension between the optional solid fillers and the liquid resin, facilitating mixing and dispersing the solids within the resin matrix. Surfactants may reduce settling and agglomeration of (optional) solid fillers to improve the uniformity, stability, and shelf life of the UV-curable resin.

Surfactants contain a mixture of hydrophobic and hydrophilic functional groups that provide simultaneous adsorption onto multiple types of surfaces. The hydrophobic functional groups may include, but are not limited to, hydrocarbon chains, fluorocarbon chains, siloxanes, or carbosilanes. The hydrophilic functional groups may have a range of compositions based on the polarity (e.g., nonionic, anionic, cationic, or zwitterionic). Examples of surfactants include, but are not limited to, carboxylates, sulfate esters, sulfonate esters, phosphates, quaternary ammonium salts, betaines, sultaines, ethoxylates, methoxysilanes, or a combination thereof. Multiple types of surfactants may be present.

The surfactant, when included, may be present in a concentration from about 0.001 wt % to about 15 wt % in the composition. In various embodiments, the surfactant is in a concentration of about 0.005, 0.01, 0.1, 0.5, 1, 2, 5, or 10 wt % of the composition.

Some variations of the present invention provide a preceramic resin precursor formulation comprising:

(a) a first material containing first molecules comprising at least one Si—N bond, at least one Si—C bond, or at least one Si—N bond and at least one Si—C bond; and (b) a second material containing second molecules of the formula:

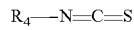

wherein $R_4$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, an alkyl halide, an aryl halide, and combinations thereof.

When the first molecules contain at least one Si—N bond, with or without Si—C bonds also present, the first molecules are referred to herein as silazanes (when monomers) or polysilazanes (when oligomers or polymers). When the first molecules contain Si—C bonds but no Si—N bonds, they are referred to herein as carbosilanes (when monomers) or polycarbosilanes (when oligomers or polymers).

The preceramic resin precursor formulation is reacted to produce a preceramic radiation-curable resin composition, such as one of the compositions discussed above. The preceramic radiation-curable resin composition contains third molecules derived from a chemical reaction between the first molecules and the second molecules contained in the precursor formulation.

In some embodiments, the first molecules contain organic or inorganic side groups selected from the group consisting of hydrogen, halides, substituted or unsubstituted cyclic or acyclic alkyl groups, aryl groups, hydrocarbon groups containing C=X double bonds or C≡X triple bonds (X is C, S, O, and/or N), and combinations thereof. Substitution on unsaturated bonds may be any atoms such as H, F, Cl, or Br, or groups such as alkyl groups, esters, amine groups, hydroxyl groups, or cyano groups (CN). For example, side groups may be selected from the group consisting of vinyl, allyl, ethynyl, vinyl ether, vinyl ester, vinyl amides, vinyl triazine, vinyl isocyanurate, acrylate, methacrylate, diene, triene, and combinations thereof.

The first molecules may contain different combinations of various unsaturated bonds. Of these different unsaturated bonds, common ones include C=C double bonds at the terminal position of the molecules (e.g., three substitutions on the C=C bonds are hydrogen atoms).

In some embodiments, the first molecules further contain one or more atoms selected from the group consisting of B, Al, Ti, Zn, Zr, O, N, P, S, Ge, and combinations thereof. These atoms may be present in the main chain or in side groups, of the first molecules. Also, these atoms may be within cyclic or acyclic groups or structures.

In some embodiments, at least 10 wt % of the first molecules is inorganic. In certain embodiments, at least 10 wt % of the first molecules is Si.

The first molecules may be selected from the group consisting of trivinylborazine; 2,4,6-trimethyl-2,4,6-trivinylcyclotrisilazane; 1,3,5,7-tetravinyl-1,3,5,7-tetramethylcyclotetrasilazane; B,B',B"-triethynyl-N,N',N"-trimethylborazine; B,B',B"-triethynylborazine; 1,2,3,4,5,6-hexamethylcyclotrisilazane; 1,1,3,3,5,5-hexamethylcyclotrisilazane; 1,2-dimethylsilazane; 1,1-perhydrosilazane; 1,3-divinyl-1,3-diphenyl-1,3-dimethyldisilazane; 1,3-divinyl-1,1,3,3-tetramethyldisilazane; 1,3,5,7-tetravinyl-1,3,5,7-tetramethylcyclotetrasilazane; 1,3,5-trivinyl-1,3,5-trimethylcyclotrisilazane; 1,1,3,3,5,5,7,7-octamethylcyclotetrasilazane; 1,2,3,4,5,6,7,8-octamethylcyclotetrasilazane; 2,2,4,4,6,6,-hexamethylcyclotrisilazane; 1,1-dimethylcyclosilazanes; poly(1,1-dimethylsilazane); poly(1,2-dimethylsilazane); polymethylcarbosilane; polyallylcarbosilane; and combinations thereof.

The first molecules are present at a concentration from about 1 wt % to about 99 wt % of the preceramic resin precursor formulation. In various embodiments, the first molecules are present at a concentration of about 2, 5, 10, 15, 20, 25, 30, 40, 50, 60, 70, 80, 90, 95, or 98 wt %, including all intervening ranges.

The second molecules are present at a concentration from about 1 wt % to about 99 wt % of the preceramic resin precursor formulation. In various embodiments, the second molecules are present at a concentration of about 2, 5, 10, 15, 20, 25, 30, 40, 50, 60, 70, 80, 90, 95, or 98 wt %, including all intervening ranges.

The sum of first molecules and second molecules may form a concentration from about 2 wt % to about 99.9 wt % of the preceramic resin precursor formulation. In various embodiments, the first and second molecules, taken together, are present at a concentration of about 5, 10, 15, 20, 25, 30, 40, 50, 60, 70, 80, 90, 95, or 99 wt %, including all intervening ranges.

The weight ratio of the second molecules to the first molecules may vary from about 0.1 to about 32, such as about 0.5, 1, 2, 3, 5, 10, 15, 20, 25, or 30. In some embodiments, the weight ratio of second molecules to first molecules is dependent on the ratio of thiol to vinyl. For example, in certain embodiments there is at least one thiol functional group per vinyl group.

In some formulations, the molar ratio of the second molecules to the first molecules is selected from about 1 to about n, where n is the degree of polymerization of the first molecules, i.e., the number of individual Si—N and/or Si—C bonds in the main chain. When the molar ratio of the second molecules to the first molecules is equal to 1, there is an average of only one second molecule inserted into each first molecule (the entire polymer chain). When the molar ratio of the second molecules to the first molecules is equal to n, there is an average of one second molecule inserted into each repeat unit of the polymer chain. That is, the first molecule is saturated with the isothiocyanates. As an example, when n=100 and the molar ratio of the second molecules to the first molecules is equal to n, then 100 second molecules react with each first molecule. In this case, one second molecule reacts with each repeat unit of the first molecule.

In certain formulations, there is an excess of second molecules in the reaction pot, so that a mixture may be provided in which the molar ratio of the second molecules to the first molecules is larger than n, such as 2n, 3n, or more. In other certain (less-preferred) embodiments, there is less than one addition of second molecules per first molecule, in which case the molar ratio of the second molecules to the first molecules is less than 1, such as 0.5, 0.1, or less.

In some embodiments, the first molecules have the formula:

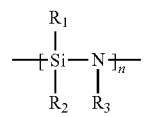

wherein:

n=1 to 100 when repeat units are connected linearly or n=2 to 10 when repeat units are connected cyclically;

$R_1$=hydrogen, a $C_1$-$C_{18}$ unsubstituted or substituted group, a halide, an ester group, an amine group, a hydroxyl group, a cyano group, and combinations thereof;

$R_2$=hydrogen, a $C_1$-$C_{18}$ unsubstituted or substituted group, a halide, an ester group, an amine group, a hydroxyl group, a cyano group, and combinations thereof; and $R_3$=hydrogen, a $C_1$-$C_{18}$ unsubstituted or substituted group, a halide, an ester group, an amine group, a hydroxyl group, a cyano group, and combinations thereof.

$R_1$, $R_2$, and $R_3$ are independently selected. Each of $R_1$, $R_2$, and $R_3$ may be selected from the group consisting of H, $CH_3$, $C_2H_3$, and combinations thereof, for example.

The second molecules are isothiocyanates ($R_4$—N=C=S), wherein $R_4$ is optionally a UV-active functional group. The isothiocyanate is capable of inserting into the backbone of the first molecules, resulting in a new silazane or polysilazane molecule, or a new carbosilane or polycarbosilane molecule, with UV functionality.

In some formulations, $R_4$ is selected from the group consisting of allyl, acrylate, methacrylate, vinyl ether, epoxide, oxetane, thiol, thioketone, isothiocyanate, and combinations, analogues, or derivatives thereof. In certain embodiments, the second molecules are selected from methyl isothiocyanate, allyl isothiocyanate, or a combination thereof. In other certain embodiments, the second molecules are selected from 2-isothiocyanatoethyl acrylate, 2-isothiocyanatoethyl methacrylate, or a combination thereof.

The formulation may further comprise an aprotic organic solvent in a concentration (when present) from about 1 wt % to about 99 wt % in the formulation. The aprotic organic solvent may be selected from the group consisting of pentane, hexane, cyclohexane, toluene, diethyl ether, tetrahydrofuran, 2-methyltetrahydrofuran, pyridine, n-methylpyrrolidine, chloroform, and combinations thereof. Other solvents may be employed, alternatively or additionally, including inorganic solvents (e.g., ionic liquids).

The formulation may further comprise a free-radical inhibitor, such as to inhibit premature polymerization and/or stabilize the formulation.

The free-radical inhibitor may be selected from the group consisting of hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, N-nitroso-N-phenylhydroxylamine aluminum salt (or another effective salt thereof), and combinations thereof, for example. The free-radical inhibitor, when present, may be in a concentration from about 0.001 wt % to about 10 wt % in the formulation, typically up to about 1 wt % of the formulation.

The first molecules and second molecules of the formulation may be reacted, under effective reaction conditions, to insert the second molecules into the backbone of the first molecules, via isothiocyanate insertion. Methods for accomplishing this insertion reaction will now be further described.

Some variations of the invention provide a method of making a preceramic radiation-curable resin composition, the method comprising:

(a) obtaining a first material containing first molecules comprising at least one Si—N bond, at least one Si—C bond, or at least one Si—N bond and at least one Si—C bond; and (b) obtaining a second material containing second molecules of the formula:

wherein $R_4$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, an alkyl halide, an aryl halide, and combinations thereof; and (c) reacting the first material with the second material, to generate a third material containing third molecules comprising at least one Si—N bond, at least one Si—C bond, or at least one Si—N bond and at least one Si—C bond, wherein the third molecules further comprise a $R_4$—N bond and a N—C=S sequence.

$R_4$ may be a UV-active functional group, such as (but not limited to) ethynyl, vinyl, allyl, acrylate, methacrylate, vinyl ether, epoxide, oxetane, thiol, thioketone, isothiocyanate, or a combination thereof. In some embodiments, $R_4$ is not a UV-active functional group.

In some methods, the molar ratio of the second molecules to the first molecules is selected from about 1 to about n, where n is the degree of polymerization of the first molecules, i.e., the number of individual Si—N and/or Si—C bonds in the main chain. When the molar ratio of the second molecules to the first molecules is equal to 1, there is an average of only one second molecule inserted into each first molecule (the entire polymer chain). When the molar ratio of the second molecules to the first molecules is equal to n, there is an average of one second molecule inserted into each repeat unit of the polymer chain. That is, the first molecule is saturated with the isothiocyanates. As an example, when n=100 and the molar ratio of the second molecules to the first molecules is equal to n, then 100 second molecules react with each first molecule. In this case, one second molecule reacts with each repeat unit of the first molecule.

In certain methods, there is an excess of second molecules in the reaction pot, so that a mixture may be provided in which the molar ratio of the second molecules to the first molecules is larger than n, such as 2n, 3n, or more. In other certain (less-preferred) embodiments, there is less than one addition of second molecules per first molecule, in which case the molar ratio of the second molecules to the first molecules is less than 1, such as 0.5, 0.1, or less.

In steps (a) and (b), "obtaining" may mean that the first or second molecules are obtained from a commercial source, or that the first or second molecules are produced from starting components.

Step (c) to chemically convert the first and second materials into the third material, may be conducted in the presence of an aprotic organic solvent. The aprotic organic solvent may be selected from the group consisting of pentane, hexane, cyclohexane, toluene, diethyl ether, tetrahydrofuran, 2-methyltetrahydrofuran, pyridine, n-methylpyrrolidine, chloroform, and combinations thereof. Other solvents may be employed, alternatively or additionally, including inorganic solvents (e.g., ionic liquids). The solvent, when present, may be in a concentration from about 0.001 wt % to about 10 wt % in the reaction mixture.

Step (c) may also be conducted in the presence of a polymerization inhibitor. The polymerization inhibitor may be selected from the group consisting of hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, N-nitroso-N-phenylhydroxylamine aluminum salt, and combinations thereof, for example. The polymerization inhibitor, when present, may be in a concentration from about 0.001 wt % to about 10 wt % in the reaction mixture.

Step (c) may be conducted at a temperature from about 0° C. to about 200° C., for about 10 minutes to about 48 hours, such as about 1-4 hours, for example. In various embodiments, step (c) may be conducted at a temperature of about 20° C., 30° C., 40° C., 50° C., 60° C., 70° C., 80° C., 90° C., 100° C., 110° C., or 120° C. In various embodiments, step (c) may be conducted for a reaction time of about 1, 2, 3, 4, 5, 10, 15, 20, 25, or 30 hours. There is generally an inverse kinetic relationship between time and temperature, such that lower temperatures require longer reaction times, and vice-versa.

Note that the first and second molecules may be reacted directly following generating them or otherwise obtaining them. Alternatively, or additionally, the first and second molecules may be stored for a period of time prior to later reacting them to produce the third molecules. The first and second molecules may be separately stored (i.e., in separate containers) or may be combined and stored together, as a formulation to be later converted to a preceramic radiation-curable resin composition. The location of making or obtaining the first and/or second molecules may be the same as, or different than, the location of reacting the first and second molecules to make the third molecules.

In some embodiments, step (c) is carried out in an inert atmosphere. For example, an inert atmosphere may be achieved and maintained using vacuum, an inert gas manifold system, or in a glove box filled with an insert gas such as helium, nitrogen, or argon.

The "reaction conversion" is the extent of reaction of first and second molecules into third molecules, based on the stoichiometrically limiting reactant. In the case of stoichiometric amounts of both reactants (first molecules and second molecules), the reaction conversion may be based on either of the reactants. In various embodiments, the reaction conversion is at least 50%, 75%, 90%, 95%, or 99%. Preferably, the reaction conversion is at least 90%, at least 95%, or essentially 100%.

The "reaction selectivity" is the selectivity of the reaction toward the desired third molecules, versus side products. In the case of perfectly stoichiometric conversion of first molecules and second molecules into third molecules, the reaction selectivity is 100%, even if there is an excess of one of the reactants or if the reaction conversion is less than 100%. In various embodiments, the reaction selectivity is at least 50%, 75%, 90%, 95%, or 99%. Preferably, the reaction selectivity is at least 90%, at least 95%, or essentially 100%.

Reaction selectivity and reaction conversion are thus separate parameters. Reaction conversion is typically dictated by kinetic parameters such as time, temperature, and the presence of a catalyst, for example, while reaction selectivity may be influenced by the nature of the starting molecules, impurities present (if any), and the kinetics of side reactions compared to the desired main reaction. "Reaction yield" is reaction conversion x reaction selectivity. In various embodiments, the reaction yield is at least 25%, 50%, 75%, or 90%. Preferably, the reaction yield is at least 80%, at least 90%, or essentially 100%.

The reaction in step (c) is carried out in a reactor, which may be agitated or non-agitated. Agitation enhances mass and heat transfer. Step (c) may be conducted as a batch, continuous, or semi-continuous process. When the reaction is continuous or semi-continuous, the flow pattern in the reactor may be plug flow, continuously stirred, or between these extremes.

The method may further include purifying the third material, after the desired reaction conversion is achieved. Purification may include removing solvent (if used), unreacted starting molecules (if any), and residual inhibitors (if any). Purifying may be accomplished by solvent/solvent extraction, evaporation (e.g., via a rotary evaporator, or "rotovap"), distillation, vacuum distillation, filtration, chromatography, centrifugation, or a combination thereof. Other purification techniques may be employed to separate and recover the third material for storage or further use.

In some method embodiments, the first molecules have the formula:

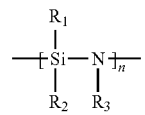

and the produced third molecules have the formula:

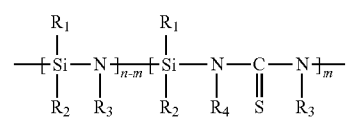

wherein:
n=1 to 100 when repeat units of the first molecules are connected linearly or n=2 to 10 when repeat units of the first molecules are connected cyclically;
m=1 to 100 and is the number of the second molecules that react with each of the first molecules;
n–m is 0 or greater;
$R_1$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof;
$R_2$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof;
$R_3$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof; and
$R_4$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, an alkyl halide, an aryl halide, and combinations thereof.

In the reaction, the isothiocyanate inserts between the Si and N atoms containing in the initial Si—N bonds of the starting silazanes. When m=n, i.e. there is stoichiometric conversion of reactants in the isothiocyanate modification reaction, then n–m=0 and the second repeat units are not present in the product (third molecules).

In some embodiments, for example, the method is carried out to accomplish the following overall reaction, producing a vinyl polysilazane:

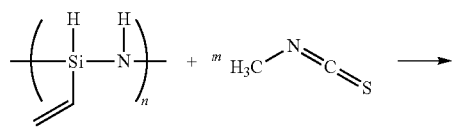

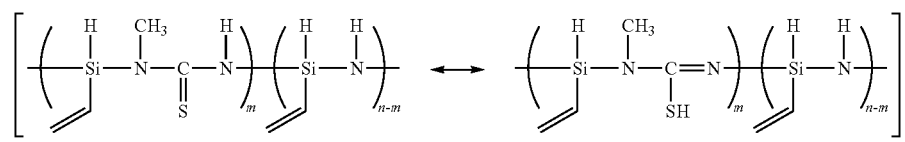

wherein n and m are as defined above, n is at least 2 (the first molecule is linear), and n–m is 0 or greater. In this reaction, m moles of methyl isothiocyanate ($H_3C$—N═C═S) react with each 1 mole of the starting polysilazane, to generate 1 mole of reaction product which is an isothiocyanate-modified polysilazane. The product equilibrium between C═S double bonds and C═N double bonds is depicted. In the first molecule, $R_1$ is a $C_2H_3$ group (containing a C═C double bond), and $R_2$ and $R_3$ are hydrogen atoms.

In other embodiments, for example, the method is carried out to accomplish the following overall reaction, producing a hydro polysilazane:

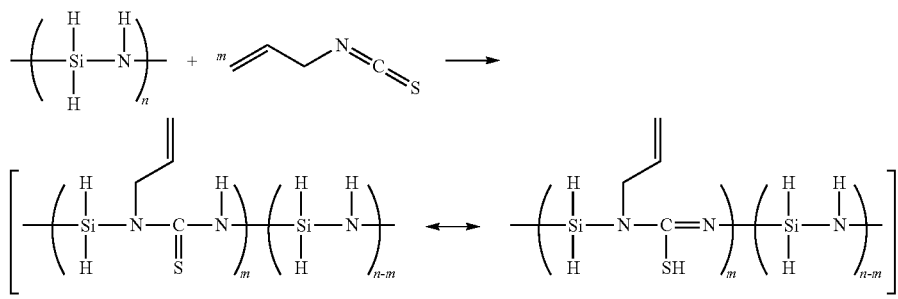

wherein n and m are as defined above, n is at least 2 (the first molecule is linear), and n–m is 0 or greater. In this reaction, m moles of allyl isothiocyanate ($H_2C$═$CHCH_2$—N═C═S) react with each 1 mole of the starting polysilazane, to generate 1 mole of reaction product which is an isothiocyanate-modified polysilazane. The product equilibrium between C═S double bonds and C═N double bonds is depicted. In the first molecule, $R_1$, $R_2$, and $R_3$ are hydrogen atoms.

In other embodiments, for example, the method is carried out to accomplish the following overall reaction, producing a cyclic vinyl silazane:

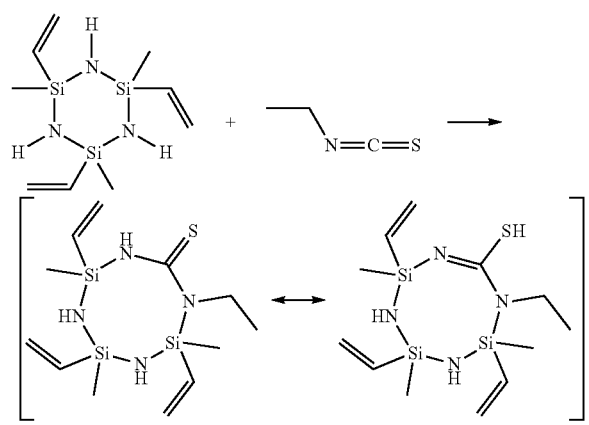

wherein n=3 and the first molecule is cyclic, m=1, and n–m is 2. In this reaction, 1 mole of the ethyl isothiocyanate ($H_3C$—$CH_2$—N═C═S) reacts with each 1 mole of the starting cyclic silazane, to generate 1 mole of reaction product which is an isothiocyanate-modified cyclic silazane. The product equilibrium between C═S double bonds and C═N double bonds is depicted. The total degree of polymerization, or cyclic oligomerization, of the product is 3. In the first molecule, $R_1$ is a $C_2H_3$ group (containing a C═C double bond), $R_2$ is a $CH_3$ group, and $R_3$ is a hydrogen atom.

In some embodiments in which the first molecules are carbosilanes with Si—C bonds, the isothiocyanate will insert between the Si and C atoms of the Si—C bonds of the starting carbosilanes, in analogous chemical reactions. In these cases, the backbone of the produced molecules contains Si, N, and C atoms but in a different arrangement compared to cases starting with silazanes. In particular, the backbone will tend to be more enriched in carbon, rather than nitrogen. In the case of isothiocyanate-modified carbosilanes, the modified portion of the polymer backbone will contain a Si—N—C(═S)—C sequence, rather than a Si—N—C(═S)—N sequence as in the case of isothiocyanate-modified silazanes. In certain embodiments, mixtures of silazanes and carbosilanes are modified with an isothiocyanate, which will produce molecules having varying distributions of silicon, carbon, and nitrogen in the polymer backbone. These embodiments may be beneficial, for example, to optimize the composition of the final ceramic material (e.g., SiCN, SiC, or a combination thereof) produced from the preceramic radiation-curable resin composition.

As mentioned earlier, the preceramic composition may further comprise a solid metal filler and/or a solid ceramic filler. A solid ceramic filler or solid metal filler is a ceramic or metal material that (a) forms at least one solid phase at 25° C. and 1 atm, and (b) enhances at least one chemical, physical, mechanical, or electrical property within the preceramic composition or a reaction product thereof. Commonly owned U.S. patent application Ser. No. 15/822,199 is hereby incorporated by reference herein, regarding certain embodiments of this disclosure.

In certain embodiments, the composition comprises from about 0.1 vol % to about 70 vol % of solid-phase fillers. The optional solid-phase fillers may have a wide range of compositions, including various metals and ceramics. For example, solid ceramic or metal filler compositions may include, but are not limited to, silicon-based ceramics such as SiOC, $SiO_2$, SiCN, SiC, SiCBN, SiOCN, $Si_3N_4$, silicate glasses, etc. Solid ceramic or metal filler compositions may include non-silicon-based ceramics such as metal oxides, e.g. $Al_2O_3$, $ZrO_2$, $TiO_2$, or $Y_3Al_5O_{12}$. Solid ceramic or metal filler compositions may include carbide-based ceramics such as carbon, graphene, diamond, and metal carbides, e.g. TiC, ZrC, HfC, or $B_4C$. Solid ceramic or metal filler compositions may include nitride-based ceramics, e.g. BN, TiN, ZrN, AlN, or $Si_3N_4$. Solid metal filler compositions may include pure metals or metal alloys, such as (but not limited to) alkali metals, alkaline earth metals, transition metals, post-transition metals, or combinations or alloys thereof.

When solid-phase fillers are present, a surfactant may also be included in the composition, to improve dispersion of, and/or minimize settling or agglomeration of, the solid-phase fillers. The surfactant may be present from about 0.001 wt % to about 15 wt % in the composition, for example. The surfactant may be selected from the group consisting of carboxylates, sulfate esters, sulfonate esters, phosphates, quaternary ammonium salts, betaines, sultaines, ethoxylates, methoxysilanes, and combinations thereof, for example.

In some embodiments, the method further comprises 3D printing and thermally treating the preceramic radiation-curable resin composition to generate a ceramic material.

The extremely high melting point of many ceramics poses a challenge to additive manufacturing to make a 3D part, as compared with metals and polymers. Ceramics cannot be cast or machined easily. By contrast, the present methods enable geometrical flexibility. As described herein, preceramic resins that are cured with ultraviolet (UV) light in a stereolithography 3D printer or through a patterned mask, for example, form 1D, 2D, or 3D polymer structures that can have complex shape and cellular architecture. These polymer structures can then be thermally converted to the corresponding 1D, 2D, or 3D ceramic part, preferably with low shrinkage, or at least uniform shrinkage.

The preceramic monomer formulations are designed to allow the ceramic structures to be formed with preferably high thermal stability (such as chemical and physical stability at temperatures greater than 1500° C.) and good mechanical strength (including stiffness, flexural strength, hardness, and/or fracture toughness).

The compositions disclosed herein may be 3D-printed using many different methods. In some variations, the compositions may be directly 3D-printed and converted to free-form ceramic matrix composite structures. A 3D-printed preceramic polymer material may be prepared directly from preceramic compositions, with no intervening steps being necessary. A 3D-printed ceramic material may then be prepared directly from the 3D-printed preceramic polymer material, with no intervening steps being necessary.

Typically, a preceramic composition is conveyed (printed) to a region of interest, such as via stereolithography, binder jetting, resin jetting with fiber placement, polyjetting, or extrusion printing, either followed by polymerization or with polymerization taking place simultaneously with the printing. Preferably, the polymerizing and 3D printing steps are performed simultaneously, at a desired location (e.g., a layer) within a part. In some embodiments, the polymerizing and 3D printing steps are performed semi-simultaneously, in which multiple steps are performed overall while at each step, some amount of polymerizing and some amount of 3D printing takes place. In some embodiments, a preceramic resin formulation is first polymerized, followed by 3D printing of the already-made polymer (e.g., a thermoplastic material).

In stereolithography, layers of resin composition are cured from the top or bottom using UV-laser rastering, projection micro-stereolithography, digital light projection, or liquid crystal device projection, for example. Smaller filler sizes are preferred since the filler size often limits the resolution, depending on material choice.

Generally speaking, "jetting" of a material means that droplets of a build material are selectively deposited onto a build bed to develop a three-dimensional object. Jetting can be carried out by liquid deposition, vapor deposition, or liquid-vapor mist deposition, for example, via spraying (such as via a nozzle in communication with a material under pressure), impingement (such as via a tube or pipe in communication with a material that is pumped), or other means.

In binder jetting, a layer of liquid resin is jetted on selected locations and cured such as via UV light or thermally. This process is similar to conventional binder jetting methods, but instead of a binder, a preceramic composition is used. An optional solid filler may initially be spread out on a substrate or on a region of polymer based on the selected monomer, if desired. After an initial step of binder jetting, another layer is generated via resin jetting and curing. This process may be repeated many times for large parts.

In resin jetting with fiber placement, solid fillers in the form of long or short fibers are placed in the preferred location and aligned in the preferred direction. Subsequently, liquid resin is jetted in selected locations and cured. The process is repeated layer-by-layer to build a part. Resin jetting with fiber placement enables printing of parts with high volume fraction (such as 30-60 vol %) of aligned fibers, resulting in improved mechanical properties for the final ceramic structure (following pyrolysis).

In polyjetting, a mixture of liquid resin (and optionally solid fillers) is jetted and written into the desired pattern. As the mixture is dispensed, it is exposed to UV light such as a laser, LED, or plasma sources, and cured into a polymer. Multiple mixtures are able to be dispensed through different nozzles, allowing for more than one composition to be utilized simultaneously. This results in tailored mechanical properties for the final ceramic structure (following pyrolysis).

In extrusion printing, the liquid resin is squeezed through a micro-nozzle, or multiple micro-nozzles, and cured via UV light. One advantage is that high-aspect-ratio fillers can be aligned with the extrusion process. Alignment generally improves mechanical properties in the aligned direction.

After a part is 3D printed using any of the above methods, or another method, the part may be post-cured. An optional thermal post-cure of the 3D polymer is performed after the 3D printing but prior to the pyrolysis to produce the ceramic structure. A post-cure step may be employed to crosslink unreacted functional groups, for example. Post-curing may be accomplished by additional UV exposure and/or a thermal post-cure at elevated temperatures (such as 60-500° C.) in an oven for about 10 minutes to about 8 hours. When a thermal post-cure is to be done, it can be beneficial to include a thermal initiator in the initial 3D-printing composition, to facilitate later thermal curing.

In some embodiments, the curing or conversion of the preceramic composition to a preceramic polymer includes crosslinking. A crosslink is a bond that links one polymer chain to another. Crosslink bonds can be covalent bonds or ionic bonds. When polymer chains are linked together by crosslinks, they lose some of their ability to move as individual polymer chains. Crosslinks are the characteristic property of thermosetting plastic materials. In most cases, crosslinking is irreversible, unless ionic bonds are employed in reversible crosslinks. See, for example, commonly owned U.S. patent application Ser. No. 15/391,749, filed Dec. 27, 2016, which is hereby incorporated by reference herein, regarding reversible crosslinks.

In some embodiments, while a monomer is being converted to polymer, a gel is formed first. Gel formation is followed by formation of a solid material as the monomer conversion is further increased, to crosslink chains together. A "gel" is a solid, jelly-like material that can have properties ranging from soft and weak to hard and tough. Gels exhibit no flow when in the steady-state. By weight, gels are mostly liquid, yet they behave like solids due to a three-dimensional crosslinked network within the liquid.

The direct, near-net-shape conversion of a preceramic 3D-printed polymer to a ceramic structure may be achieved by pyrolysis or other thermal treatment, such as (but not limited to) sintering, annealing, or calcination. Typically, the thermal treatment is based on heating the 3D-printed structure for an extended period of time (such as from 10 minutes to 1 week) under various inert or reactive atmospheres.

Thermal treatment may be done for an extended period of time under various inert or reactive atmospheres, including but not limited to $N_2$, Ar, He, air, $CO_2$, CO, $H_2$, $CH_4$, $C_2H_6$, $C_2H_4$, $NH_3$, or a combination thereof. Treatment pressures may vary from about 1 atm to about 20 atm, for example. Vacuum pyrolysis may also be employed, in which the treatment pressure is less than 1 atm, again under various atmospheres as noted above.

The pyrolysis or other thermal treatment may include heating at a heating rate of 0.1-20° C./min from ambient temperature to an elevated temperature from about 500° C. to about 2000° C., such as from about 800° C. to about 1100° C. When it is desired to convert the polymerized liquid resin formulation into ceramic material, the selected temperature needs to at least be equal to the pyrolysis temperature of the polymerized liquid resin formulation (a polymer property defined above), and preferably greater than such pyrolysis temperature, such as at least 50° C., 100° C., 200° C., 300° C., 400° C., or 500° C. greater than the pyrolysis temperature of the polymerized liquid resin formulation.

When it is desired to convert the solid polymer filler also into ceramic material, the selected temperature needs to at least be equal to the pyrolysis temperature of the solid polymer filler, and preferably greater than such pyrolysis temperature, such as at least 50° C., 100° C., 200° C., 300° C., 400° C., or 500° C. greater than the pyrolysis temperature of the solid polymer filler.

Slow heating rates are preferred to enable evolving gases to escape, thereby minimizing porosity in the final part. When porosity is desired, higher heating rates (e.g., higher than 20° C./min) may be employed. The pyrolysis or other thermal treatment may also include dwelling at the elevated temperature (e.g., 950° C.) for at least 1, 5, 10, 15, 30, or 60 minutes, for example. Following pyrolysis, the material may be cooled at a cooling rate (magnitude) of 0.1-20° C./min back to ambient temperature. In some embodiments, faster cooling (e.g., higher than 20° C./min in magnitude) is desired to freeze-in a desired microstructure, for example.

The thermal treatment is preferably performed following polymerization and any (optional) thermal post-cure of the 3D-printed polymer. In certain embodiments, the thermal treatment is combined (i.e., overlaps in time and/or temperature) with polymerization, thermal post-cure, or both. It will also be recognized that even when a sequential operation is intended, some amount of ceramic formation may occur prior to a planned step of thermal treatment, as a result of the intrinsic kinetics and thermodynamics of the reaction system.

In some embodiments, a reactive thermal treatment is performed, in which the gas that is initially present is reactive toward the initial polymer, the final ceramic material, or both of these. When the gas is reactive, it may react with a component and cause it to leave the material. Alternatively, or additionally, the gas may react with a component and remain with the base material. It is also possible for the gas to react and form products, some of which depart from the material while the rest remains with the material. Reactive gases may be selected from $O_2$, air, $O_3$, CO, $CO_2$, $H_2$, $H_2O$, $CH_4$, $SO_2$, $H_2S$, $NH_3$, NO, $NO_2$, and $N_2O$, and so on. The maximum temperature for reactive thermal treatment may be, for example, about 300° C. to about 2000° C. The system pressure may also be adjusted to influence the gas atmosphere.

In some embodiments, a solid polymer filler and the preceramic polymer (from polymerization of the resin composition) pyrolyze in parallel to form a cohesive ceramic structure. The ceramic microstructure may be homogenous or heterogeneous. That is, regions derived from pyrolysis of the preceramic polymer may be heterogeneous with discrete regions derived from pyrolysis of the solid polymer filler. Or, the final ceramic structure may be homogeneous, without discrete regions derived from pyrolysis of the preceramic polymer versus those derived from pyrolysis of the solid polymer filler.

Following pyrolysis or other thermal treatment, the ceramic material comprises chemically and/or physically interconnected ceramic materials such as, but not limited to, silicon oxycarbide (SiOC), silicon carbide (SiC), silicon nitride ($Si_3N_4$), silicon oxynitride (SiON), silicon oxycarbonitride (SiOCN), silicon carbonitride (SiCN), silicon boronitride (SiBN), silicon boron carbonitride (SiBCN), boron nitride (BN), and/or silicon metal carbides, oxides, or nitrides. The ceramic materials may be interconnected in a solid solution, and/or there may be chemical bonds between individual ceramic particles. There may also be an interface layer between ceramic materials. The ceramic materials may be interconnected within a three-dimensional structure.

The composition of the ceramic part or ceramic matrix composite obviously is directly dependent on the composition of the starting preceramic composition as provided in this disclosure.

In some embodiments, final ceramic structures are lightweight, strong, and stiff—but can withstand a high-temperature oxidizing environment. The configuration and microstructure of the preceramic polymer determine the composition, microstructure, and yield of the ceramic material after thermal treatment. A high crosslink density may be preferred to prevent the fragmentation and loss of low-molecular-mass species, which have not fully converted to either ceramic or escaping gases, during thermal treatment.

During the thermal treatment, whether an inert or reactive thermal treatment technique is employed, gases escape. Gases are formed during the conversion of preceramic polymer to the ceramic structure, by decomposition reactions of the polymer and other materials present. The escaping gases or vapors may include (but are by no means limited to) $CH_4$, $H_2$, CO, $CO_2$, $H_2O$, $SO_2$, $H_2S$, $CH_3S$, etc.

The final ceramic structure may be characterized by an actual density that is at least 50% of theoretical density, preferably at least 75% of theoretical density, and more preferably at least 95% of theoretical density. By "theoretical density" it is meant the density of the material itself, calculated in the absence of porous voids. For example a ceramic structure with absolute density of 2.0 g/cm³, fabricated from a base material with inherent (bulk) density of 2.1 g/cm³, exhibits 2.0/2.1=95% of theoretical density. In certain embodiments, without limitation, the ceramic structure is a fully dense monolith, which means that the ceramic structure has at least 99% (e.g., essentially 100%) of theoretical density associated with a part or continuous region of material (also referred to as a "monolith"). The absolute density in g/cm³ will vary, depending on the selection of base materials; an exemplary range is about 1 g/cm³ to about 5 g/cm³.

The overall mass loss associated with the conversion of preceramic polymer to the ceramic structure may vary widely, such as from about 1 wt % to about 90 wt %, e.g. about 5, 10, 20, 30, 40, 50, 60, 70, or 80 wt %. The overall mass loss will be dictated by the starting formulation (e.g., fraction organic versus inorganic) as well as by process parameters. In principle, the lost mass may be recovered separately and used for other purposes.

Associated with mass loss may be shrinkage of the preceramic polymer as it converts to the ceramic structure. The linear shrinkage (calculated in a single dimension, such as height of part) may be from 0% to about 60%, for example. Note that the mass loss and shrinkage are not necessarily correlated. In some embodiments with high mass loss, there is not much (if any) shrinkage. These embodiments tend to produce higher porosity and therefore lower densities. In some embodiments with high mass loss, there is substantial shrinkage, unless certain solid-phase fillers are utilized as described above. These embodiments tend to produce lower porosity, or no porosity, and therefore higher densities (e.g., fully dense ceramic materials). Finally, in some embodiments, there is little mass loss but shrinkage associated with chemical reactions taking place. These embodiments also tend to produce relatively high densities.

Despite shrinkage, if any, the bulk shape (relative geometry) of the preceramic 3D-printed polymer may be preserved in the final ceramic structure. That is, when shrinkage is uniform in all dimensions, the geometrical features are retained in the part: it is a scaled-down version, in all three dimensions. In some embodiments, shrinkage is approximately uniform, which means the geometrical features are basically maintained, with slight deviations. Uniform shrinkage occurs when there is no random fragmentation during conversion of the preceramic polymer to the ceramic structure, and when the reactions and gas escape are isotropic within the material. Note that very small features, such as at the nanoscale, may not be preserved during otherwise uniform shrinkage.

Practically speaking, uniform shrinkage (or no shrinkage, in certain embodiments employing active functional additives) enables the formation of parts that are "net shape" or "near net shape." "Net shape" means that the geometrical features are retained, so that manufactured parts allow final fabrication matching the intended design with little or no post-processing. "Near net shape" means that the geometrical features are not perfectly retained but require only minimal post-processing or hand-work. Both net-shape parts and near-net-shape parts require little or no machining, polishing, bonding, surface finishing, or assembly.

The strength of the final ceramic material will vary, depending on the initial preceramic composition, as well as the processing parameters. In some embodiments, the final ceramic material is characterized by a Young's Modulus of at least about 200 GPa, 300 GPa, 400 GPa, 500 GPa, or more, measured at 25° C. In some embodiments, the final ceramic material is characterized by a flexural strength of at least about 300 GPa, 400 GPa, 500 GPa, or more, measured at 25° C. In some embodiments, the final ceramic material is characterized by a hardness of at least about 10 GPa, 20 GPa, 30 GPa, or more, measured at 25° C.

The thermal stability of the final ceramic material will vary, depending primarily on the initial preceramic resin formulation, as well as the processing parameters. In various embodiments, the final ceramic material is thermally stable at a temperature of at least 1500° C., 1600° C., 1700° C., 1800° C., 1900° C., or 2000° C. Thermal stability means at least that the ceramic material does melt at these temperatures, and preferably also that the ceramic material does not react (e.g., by oxidation or reduction), undergo thermal shock, or physically decompose (introducing defects) at these temperatures. In some embodiments, for example, the ceramic structure is characterized by being stable in the presence of air at a temperature of about 1000° C., 1100° C., 1200° C., 1300° C., 1400° C., 1500° C., 1600° C., 1700° C., 1800° C., or higher.

Multiple ceramic structures may be obtained and then joined, using methods such as, but not limited to, those described in commonly owned U.S. patent application Ser. No. 15/840,146, filed on Dec. 13, 2017, which is hereby incorporated by reference.

The final ceramic structure, even when no machining, polishing, bonding, surface finishing, or assembly is required, may be subjected to coloring (e.g., with inks or dyes), stamping, or other non-functional features, if desired.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

This specification hereby incorporates by reference Eckel et al., "Additive manufacturing of polymer-derived ceramics" *Science*, volume 351, issue 6268, pages 58-62, January 2016.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A preceramic radiation-curable resin composition comprising a molecule having the formula:

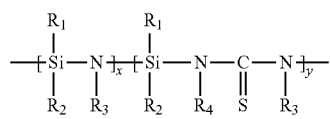

wherein:
x=0 to 100 when repeat units are connected linearly or are not present, or x=0 to 10 when repeat units are connected cyclically or are not present;
y=1 to 100 when repeat units are connected linearly or y=1 to 10 when repeat units are connected cyclically;
$R_1$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof;

$R_2$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof;

$R_3$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof; and $R_4$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, an alkyl halide, an aryl halide, and combinations thereof.

2. The composition of claim 1, wherein each of $R_1$, $R_2$, $R_3$, and $R_4$ is independently selected from the group consisting of H, $CH_3$, $C_2H_3$, $C_3H_5$, and combinations thereof.

3. The composition of claim 1, wherein $R_4$ is selected from the group consisting of ethynyl, allyl, vinyl, acrylate, methacrylate, vinyl ether, epoxide, oxetane, thiol, thioketone, isothiocyanate, and combinations, analogues, or derivatives thereof.

4. The composition of claim 1, said composition further comprising a photoinitiator that generates free radicals from said molecule under exposure to light with a wavelength from about 200 nm to about 500 nm.

5. The composition of claim 1, said composition further comprising a thermal free-radical initiator selected from the group consisting of benzoyl peroxide, dicumyl peroxide, 2,2'-azobisisobutyronitrile, platinum-carbonyl-cyclovinylmethylsiloxane complex, platinum-divinyltetramethyldisiloxane complex, and combinations thereof.

6. The composition of claim 1, said composition further comprising a free-radical inhibitor.

7. The composition of claim 1, said composition further comprising a 3D-printing resolution agent selected from the group consisting of UV absorbers, fluorescent molecules, optical brighteners, and combinations thereof.

8. The composition of claim 1, said composition further comprising a crosslinking aid with UV functionality.

9. The composition of claim 1, said composition further comprising from about 0.1 vol % to about 70 vol % of solid-phase fillers.

10. The composition of claim 1, said composition further comprising a surfactant from about 0.001 wt % to about 15 wt % in the composition.

11. A preceramic resin precursor formulation comprising:
(a) a first material containing first molecules comprising at least one Si—N bond, at least one Si—C bond, or at least one Si—N bond and at least one Si—C bond; and
(b) a second material containing second molecules of the formula:

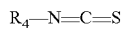

wherein $R_4$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, an alkyl halide, an aryl halide, and combinations thereof.

12. The formulation of claim 11, wherein said first molecules contain side groups selected from the group consisting of hydrogen, halides, substituted or unsubstituted cyclic or acyclic alkyl groups, aryl groups, hydrocarbon groups containing C=X double bonds or C≡X triple bonds (X is C, S, O, and/or N), and combinations thereof.

13. The formulation of claim 11, wherein said first molecules contain side groups selected from the group consisting of vinyl, ethynyl, allyl, vinyl ether, vinyl ester, vinyl amides, vinyl triazine, vinyl isocyanurate, acrylate, methacrylate, diene, triene, and combinations thereof.

14. The formulation of claim 11, wherein said first molecules further contain one or more atoms selected from the group consisting of B, Al, Ti, Zn, Zr, O, N, P, S, Ge, and combinations thereof.

15. The formulation of claim 11, wherein said first molecules have the formula:

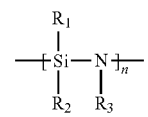

wherein:
n=1 to 100 when repeat units are connected linearly or n=2 to 10 when repeat units are connected cyclically;

$R_1$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof;

$R_2$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof; and $R_3$ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof.

16. The formulation of claim 15, wherein each of $R_1$, $R_2$, and $R_3$ is independently selected from the group consisting of H, $CH_3$, $C_2H_3$, $C_3H_5$, and combinations thereof.

17. The formulation of claim 11, wherein $R_4$ is selected from the group consisting of ethynyl, vinyl, allyl, acrylate, methacrylate, vinyl ether, epoxide, oxetane, thiol, thioketone, isothiocyanate, and combinations, analogues, or derivatives thereof.

18. The formulation of claim 11, said formulation further comprising an aprotic organic solvent in a concentration from about 1 wt % to about 99 wt % in said formulation.

19. The formulation of claim 11, said formulation further comprising a free-radical inhibitor in a concentration from about 0.001 wt % to about 10 wt % in said formulation.

20. The formulation of claim 11, said formulation further comprising a crosslinking aid with UV functionality.

21. A method of making a preceramic radiation-curable resin composition, said method comprising:
(a) obtaining a first material containing first molecules comprising at least one Si—N bond, at least one Si—C bond, or at least one Si—N bond and at least one Si—C bond; and
(b) obtaining a second material containing second molecules of the formula:

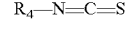

wherein R₄ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, an alkyl halide, an aryl halide, and combinations thereof; and (c) reacting said first material with said second material, to generate a third material containing third molecules comprising at least one Si—N bond, at least one Si—C bond, or at least one Si—N bond and at least one Si—C bond, wherein said third molecules further comprise a R₄—N bond and a N—C=S sequence.

22. The method of claim 21, wherein the molar ratio of said second molecules to said first molecules is selected from about 1 to about n, wherein n is the average degree of polymerization of said first molecules.

23. The method of claim 21, wherein said first molecules have the formula:

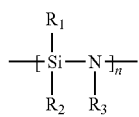

and wherein said third molecules have the formula:

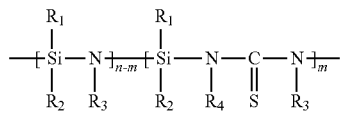

wherein:

n=1 to 100 when repeat units of the first molecules are connected linearly or n=2 to 10 when repeat units of the first molecules are connected cyclically;

m=1 to 100 and is the number of the second molecules that react with each of the first molecules;

n–m is 0 or greater;

R₁ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof;

R₂ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof; and R₃ is selected from the group consisting of hydrogen, a $C_1$-$C_{18}$ unsubstituted or substituted group, a halide, an ester group, an amine group, a hydroxyl group, a thiol group, a cyano group, a cyanate group, a thiocyanate group, and combinations thereof.

24. The method of claim 21, said method further comprising 3D printing and thermally treating said preceramic radiation-curable resin composition to generate a ceramic material.

* * * * *